July 31, 1962  P. A. MARTINEAU  3,046,667
UNIVERSAL SPOTTING MACHINE
Filed Nov. 25, 1960  2 Sheets-Sheet 1

INVENTOR.
PAUL A. MARTINEAU
BY Dale A. Winnie
ATTORNEY

July 31, 1962   P. A. MARTINEAU   3,046,667
UNIVERSAL SPOTTING MACHINE
Filed Nov. 25, 1960   2 Sheets-Sheet 2

INVENTOR.
PAUL A. MARTINEAU
BY
Dale A. Winnie
ATTORNEY 3,046,667
UNIVERSAL SPOTTING MACHINE
Paul A. Martineau, Detroit, Mich., assignor to Aceweb Tool & Mfg. Co., Detroit, Mich., a company of Michigan
Filed Nov. 25, 1960, Ser. No. 71,615
6 Claims. (Cl. 33—174)

The invention relates to spotting fixtures such as are most commonly known and used for die checking purposes.

Several different types of spotting machines or fixtures are known and are in use for die checking purposes. Most of these devices serve no other purpose nor lend themselves to other than the specific purpose of enabling a work piece to be checked against a master die member. Invariably, the work piece must be removed from the die checking fixture to enable it to be properly worked to the dictates of the master die.

A significant part of the cost of tooling dies is readily attributed to the time lost by master craftsman in setting-up, checking, and subsequently removing a die under construction to enable proper access for the work required. Much time and expense could be saved with a checking fixture which would enable ready access to the work piece from any angle and without prior removal or subsequent positive repositioning for die checking purposes.

Accordingly, it is an object of this invention to provide a spotting machine which enables universal freedom of movement of a work piece, for ready working access, without removal from the checking fixture.

It is also an object of this invention to provide a universal spotting device wherein the work piece may be positively repositioned relative to the master work guide at any time and repeatedly without accumulating lost set-up time.

Another object of this invention is to teach a relatively simple and inexpensive fixture affording positive die checking accuracy, and ready work access from any position, and which is durable in construction and involves no complicated mechanism.

More particularly, the objects of this invention include providing a mobile work supporting stand which may be moved about a work shop and positioned close to a work bench or the best available light source, having a work and master die receiving cradle enabling the work to be tilted to any required angle, having a slide table receptive of the work and enabling limited freedom of movement from the confines of the cradle, having a rotary table for further freedom of angular positioning, and providing these means in combination to enable ready repositioning of the work for checking with the master die.

These and other objects and advantages in the practice of this invention will be more apparent upon a study of the following specification and accompanying drawing in regard to a preferred form and working embodiment of such invention.

Figure 1:
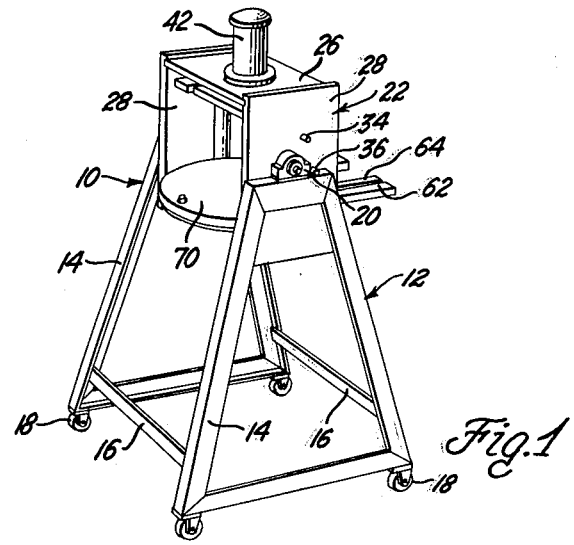
FIGURE 1 is a perspective view of the proposed universal spotting machine showing the cradle thereof in a tilted position.
Figure 2:
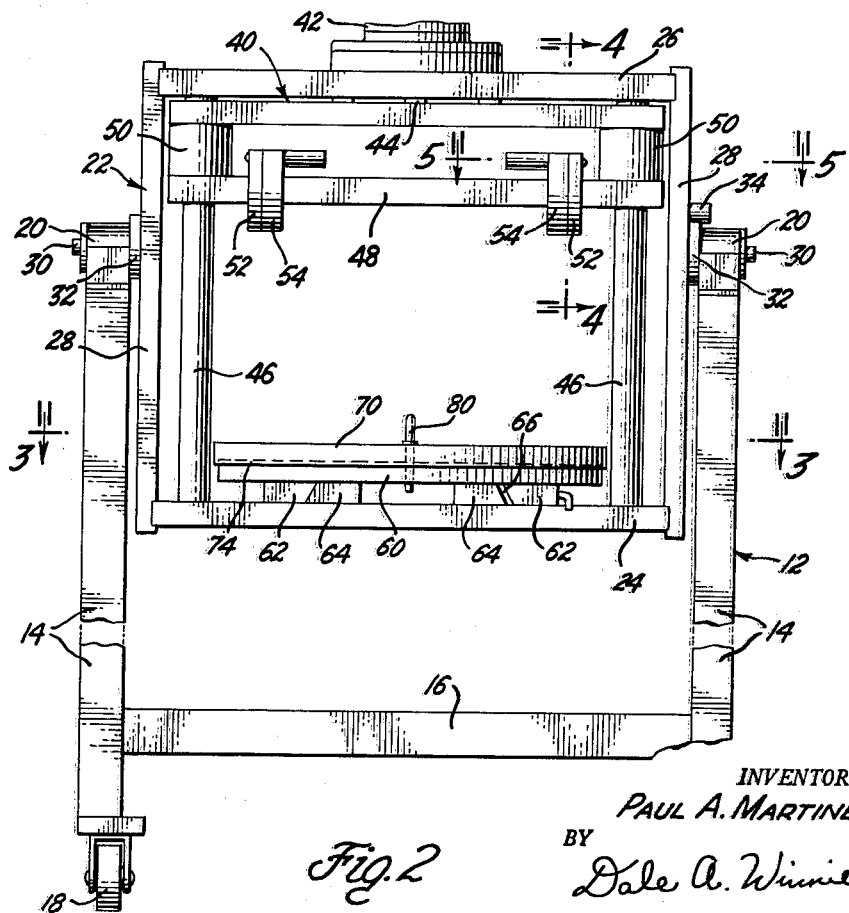
FIGURE 2 is an enlarged front plan view of the proposed device.

The universal spotting fixture 10 shown by the drawings, and embodying the principles of this invention, comprises a support stand 12 which is freely mobile about a work shop floor. The support stand 12 includes side frames 14 which are secured together by lower cross rails 16. Casters 18 are mounted on the lower corners of the vertical side frames 14 to provide the mobility mentioned.

Trunnion support bearings 20 are provided on the upper extremity of the side frames 14. Within the trunnion support bearings 20 is supported a work receiving cradle 22. Such cradle member includes relatively spaced bed and top plates 24 and 26, respectively, which are joined together by side members 28. Trunnion supports 30 are provided on the side member 28 and spacers 32 serve to center the work receiving cradle between the side frames 14 of the support stand 12.

It will be appreciated that the mass-center of the cradle is disposed below the trunnion supports 30 so that the cradle is not top heavy and inclined to flip over. At the same time, a reasonably balanced position is preferred.

The trunnion support of the cradle 22 within the support stand 12 enables the cradle to be tilted in any selected position relative thereto. Suitable stops 34 and 36 extend outwardly from the sides 28 of the cradle member for certain limit-stop positioning thereof. The one stop 34 precludes unnecessary full rotation of the cradle 22 and the other stop 36 serves to vertically locate the cradle relative to the support stand 12.

The trunnion supported cradle 22 includes a power operated ram 40 disposed between the bed plate 24 and top plate 26 of the cradle member. A double-acting piston cylinder member 42 serves as the power operator and is mounted on the top plate 26 with the piston rod shaft 44 extended through the top plate and engaged to the ram 40. Vertical guide rods 46 between the top and bed plates of the cradle 22 serve to guide the ram in its reciprocal travel.

The master die supporting table 48 is engaged to the power ram 40 and is separated therefrom by spacers 50. The lower disposed extensions of the ram include vertical guides 52 which are complemented by guides 54 on the master die table itself. The master die table 48 is trunnion supported between the depending guides 52 of the ram and is tiltable to selected positions by means of a series of detent receiving holes 56 provided in the guides 52 and a spring loaded detent member 58 mounted in the matching guides 54 of the master die table.

A slide table 60 is provided on the bed plate 24 of the cradle member. Reciprocal movement is afforded by means relatively spaced complementary guides 62 and 64; one of which is engaged to the bed plate 24 and the other of which is engaged to the underside of the slide table 60. At least one of the pairs of guides 62 and 64 includes locking grooves 66 to hold the slide table to its guide members. A slide lock 68 of the spring loaded or other detent locking type is provided within the ends of one of the pairs of guide members.

Figure 3:
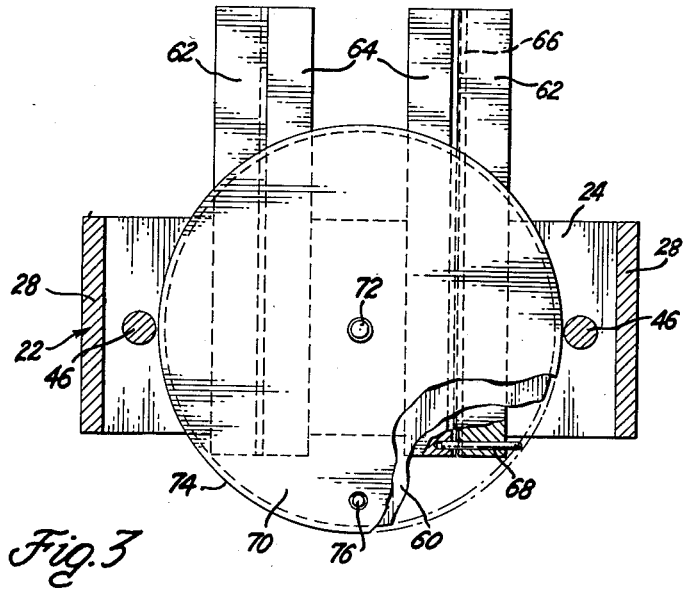
FIGURE 3 is an enlarged top plan view of the slide and rotary tables with parts broken away for better illustration of the slide mechanism.
Figure 4:
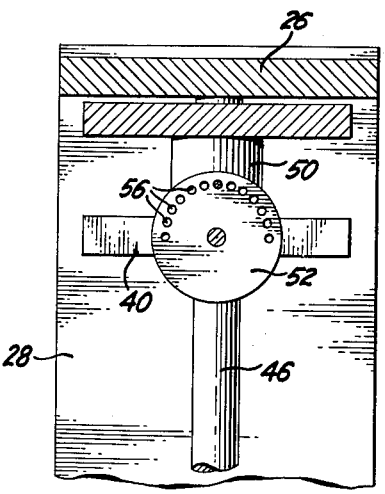
FIGURE 4 is an enlarged cross-sectional view of the master die table positioning means as seen in the plane of line IV—IV of FIGURE 2.
Figure 5:
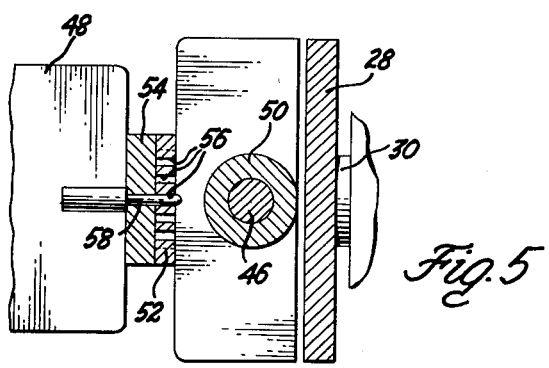
FIGURE 5 is an enlarged cross-sectional view of the master die table positioning means as seen in the plane of line V—V of FIGURE 2.

The guide members 62 and 64 are sufficiently extended on one side of the cradle 22, as shown by FIGURES 1 and 3, to serve as an off-center weight assuring the free standing vertical disposition of the cradle with the stop 36 in tilt limiting engagement with the side frame 14. This is best illustrated by FIGURE 1.

A rotary table 70 is provided on the slide table 60. The table 70 is rotatable about an axis 72 centrally through the slide table. The table 70 is circular in shape, as is the slide table 60, and includes a depending annular flange 74 which overlaps the peripheral edge of the slide table 60 and serves as a guide for relative rotary movement between the two tables.

Relatively aligned holes 76 through the rotary table 70 and slide table 60 are provided and are receptive of a shot pin 80 therethrough to lock the two tables together when desired. It will be appreciated that the shot pin 80 may be also used to locate the slide table 60 relative to the bed plate 24.

From the description of the spotting fixture 10 thus far described, it will be appreciated that a work piece received on the rotary table 70 is positionable as best suits any work required to be done thereon. The table 70 affords rotational freedom about a central axis therethrough, the slide table 60 enables the work to be moved forward and aft, the cradle 22 enables the work to be tilted to any angular position and, of course, the combination of these movements affords universal freedom for any selected positioning of the work piece which is required. As previously mentioned, the mobile support stand 12 also enables the entire fixture to be readily moved to any location or as best suits the convenience of the craftsman working on the selected work piece.

The trunnion supported master die receiving table 48 may be conveniently tilted relative to the ram 40, and the whole cradle 22 may be tilted further, as most conveniently disposes the master die receiving table for having the master die member (not shown) secured thereto. It also follows, that the master die table 48 may be readily tilted to any selected position which will afford better access to the work piece under construction.

Although each of the different means of affording relative freedom of movement for a work piece is generally known, the combination of certain of these different means, and most certainly the over-all combination of the particular means selected, provides a simple, compact and useful spotting fixture not heretofore known.

I claim:

1. A die spotting fixture, comprising; a mobile support stand having a work receiving cradle member trunnion supported thereon, said cradle including a bed, a slide table provided on the bed of said cradle member and a rotary table provided on said slide table, a ram guided for reciprocal travel relative to the bed of said cradle, said ram being receptive of a master checking member and said rotary table being receptive of a work piece to be checked, and means for locking said tables in die checking fixed position relative to said cradle and the master die supporting ram thereof.

2. The die spotting fixture of claim 1, including; a circular slide table having said rotary table received in peripherally guided engagement therewith.

3. The die spotting fixture of claim 1, including; stop means provided on one of said stand and cradle member for engagement with the other thereof to limit the tiltable freedom of said cradle, and said cradle having an overhanging portion disposed to weight said cradle for limit stop engagement and free standing vertical disposition thereof.

4. The die spotting fixture of claim 1, including; a master die receptive member trunnion supported to said ram, and means for positively locating said master die receptive member relative to said ram for die checking purposes and in relative free tiltable relation thereto for assembly of a master die thereto and unobstructed access to a work piece on said rotary table as required.

5. A die spotting fixture, comprising; a mobile stand including side frames and having a free tilting cradle member trunnion supported therebetween, said cradle including a bed, a slide table mounted on the bed of said cradle member, a rotary table mounted on said slide table and receptive of a work piece, a ram mounted in said cradle and reciprocal relative to the bed thereof, means guiding the travel of said ram in said cradle, a master die receptive member operatively engaged to said ram and in guided engagement with said guiding means, said master die receptive member being trunnion supported relative to said guiding means for selected tiltable relocation thereof to facilitate assembly of a master die member thereto and unobstructed access to a work piece on said rotary table, and means for positive relocation of said master die receptive table for die checking purposes.

6. A universal spotting machine for die checking use, and comprising; a caster supported stand freely mobile on a work shop floor for convenient disposition near a work bench and elsewhere, a work receiving cradle trunnion supported within said stand for oscillatory movement relative thereto, counterweight and stop means provided on said cradle for free standing vertical positioning thereof relative to said stand, said cradle including a work receiving bed and having a master die receiving ram disposed thereover, trunnion support means for mounting said master die to said ram, power means for moving said ram relative to said work receiving bed and guide means for positive guided actuation thereof, a slide table mounted on said work receiving bed, a rotary table mounted on said slide table and receptive of a work member thereon, means for positively positioning a work member on said rotary table in die checking relation to a master die member supported by said ram, and means for locking said rotary and slide tables in die checking position following the relative freedom of universal positioning afforded by said tables and said cradle as well as the mobility of said stand.

No references cited.